(12) United States Patent
Luo (10) Patent No.: US 7,912,263 B2
(45) Date of Patent: Mar. 22, 2011

(54) METHOD FOR DETECTING CLIPPED ANATOMY IN MEDICAL IMAGES

(75) Inventor: Hui Luo, Rochester, NY (US)

(73) Assignee: Carestream Health, Inc., Rochester, NY (US)

(*) Notice: Subject to any disclaimer, the term of this patent is extended or adjusted under 35 U.S.C. 154(b) by 785 days.

(21) Appl. No.: 11/834,222

(22) Filed: Aug. 6, 2007

(65) Prior Publication Data

US 2009/0041325 A1 Feb. 12, 2009

(51) Int. Cl.
G06K 9/00 (2006.01)
A61B 6/04 (2006.01)

(52) U.S. Cl. ............................. 382/128; 382/195; 378/37

(58) Field of Classification Search .................. 382/128, 382/129, 130, 131, 132, 133, 134, 168, 170, 382/181, 192, 195, 199, 201, 209, 224, 232, 382/254, 255, 274, 276, 289, 298, 305, 312; 348/208.99; 378/37

See application file for complete search history.

(56) References Cited

U.S. PATENT DOCUMENTS

| | | | | |
|---|---|---|---|---|
| 5,164,993 A | * | 11/1992 | Capozzi et al. | 382/132 |
| 5,633,511 A | * | 5/1997 | Lee et al. | 250/587 |
| 6,574,307 B1 | * | 6/2003 | Anderton | 378/98.7 |
| 7,519,207 B2 | * | 4/2009 | Luo et al. | 382/128 |
| 2003/0095626 A1 | * | 5/2003 | Anderton | 378/98.7 |
| 2006/0110068 A1 | | 5/2006 | Luo | |

* cited by examiner

Primary Examiner — Seyed Azarian (57) ABSTRACT

A method for detecting clipped anatomy in a radiographic image obtains image data for the radiographic image and arranges the image data according to a predetermined image orientation. A set is formed having one or more regions of interest that are located near the borders of the image. Image content is analyzed in each region of interest in the set and one or more regions with clipped anatomy are identified.

14 Claims, 7 Drawing Sheets

METHOD FOR DETECTING CLIPPED ANATOMY IN MEDICAL IMAGES

FIELD OF THE INVENTION

The invention relates generally to techniques for processing medical images, and in particular to techniques for automatically detecting clipped anatomy in medical images.

BACKGROUND OF THE INVENTION

Radiographic images of anatomical regions are a routine and valuable diagnostic and research tool. Such images are typically produced by placing a receiver behind or beneath a portion of a patient and exposing the patient to radiation such as X-rays, alpha rays, beta rays, gamma rays, ultraviolet rays, and the like. The receiver may be a direct radiography (DR) receiver that forms an image directly from the received radiation or, with conventional film or Computed Radiograph (CR) systems, a plate having a surface composed of excitable phosphors. As the radiation energy strikes the surface of the plate, a portion of the energy is stored by the phosphor-containing surface. Upon subsequent stimulation by visible light or other stimuli, the phosphor gives off light in direct proportion to the amount of radiation energy stored therein. Areas of the plate receiving unattenuated radiation absorb the most energy and thus produce the most light when subsequently stimulated. Areas in which lesser amounts of radiation energy are absorbed, due to the presence of the object (for example, a body region), produce a proportionately lesser amount of light when subsequently stimulated.

The image obtained from the receiver can be displayed for viewing. For example, the stored energy of the film can be photoelectrically detected and converted into a signal which is then further processed or used to reproduce the image on a photographic film, display CRT, or similar display device.

One common radiographic image utilized in clinical settings today is an image of the thoracic area of human body (for example, a standard chest x-ray). Such images provide useful information and are used to diagnose maladies ranging from lung and breast cancer to emphysema.

Figure 1A:
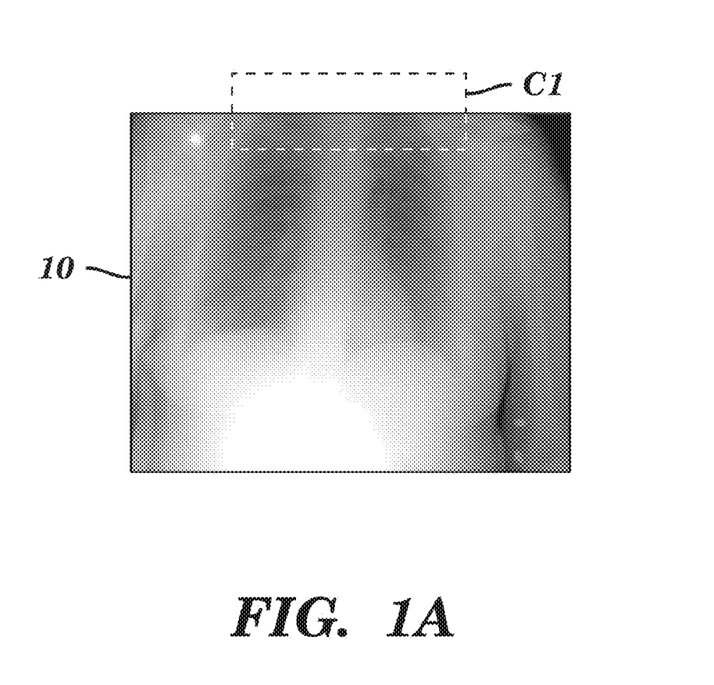
FIG. 1A shows an image with clipped apex region.
Figure 1B:
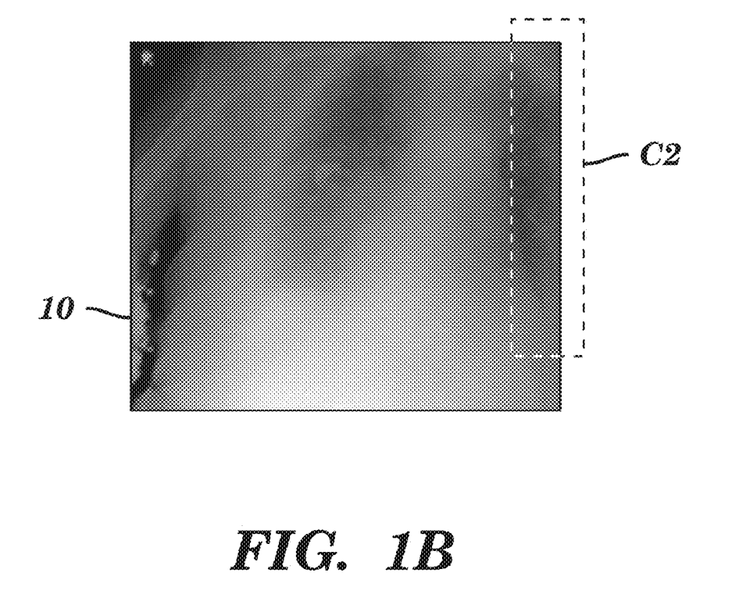
FIG. 1B shows an image with clipped lung region.

Before the radiographic image is reviewed/interpreted, the completeness of radiographic anatomy is typically checked. Missing or clipped portions of the radiographic anatomy can make it difficult or impossible to properly interpret the radiograph. For example, in a standard chest anterior-posterior view radiograph, complete imaging of both left and right lung regions is important for chest radiograph interpretation. If there were a cut-off or clipped region in the lung area, as shown in either of FIG. 1A or 1B, the radiograph would be rejected. FIG. 1A shows a chest x-ray image 10 that is clipped in the upper or apex region, as indicated by the dashed line box labeled C1. FIG. 1B shows a chest x-ray image 10 that is clipped at the side, as indicated by the dashed line box labeled C2.

If clipped anatomy prevents diagnosis, the x-ray image can be retaken. However, retaking the radiographic image is undesirable, since it exposes the patient to additional radiation. Rescheduling complications and delays, increased cost, and other administrative problems can also be among the unwelcome results of clipped anatomy. It would be advantageous, therefore, to detect clipped anatomy at the time that the radiograph is generated. On-the-spot detection of this type of problem can help to prevent unwanted delays due to patient re-scheduling and help to facilitate hospital workflow.

Thus, there is a need for a method and apparatus that allow an anatomy image-clipping problem to be automatically detected in a radiographic image that is obtained as digital data.

SUMMARY OF THE INVENTION

An object of the present invention is to provide an automated method for detecting clipped anatomy in a radiograph. According to one aspect, the present invention provides a method for detecting clipped anatomy in a radiographic image comprising: obtaining image data for the radiographic image; arranging the image data according to a predetermined image orientation; forming a set comprising one or more regions of interest located proximate the borders of the image; and analyzing image content in each region of interest in the set and identifying any region with clipped anatomy.

According to another aspect, the present invention provides a method for detecting clipped anatomy in a radiographic image comprising: obtaining image data for the radiographic image; arranging the image data according to a predetermined image orientation; outlining anatomical structures in the image; analyzing the position and geometrical properties of the anatomical structures in the image and identifying one or more clipped anatomical structures.

The present invention can use a predetermined set of regions for each type of radiographic image.

The present invention allows radiographic imaging personnel to learn of a clipped anatomy problem as soon as the image data is obtained. This can make it easier to correct for a clipping error with less inconvenience to the patient.

These and other objects, features, and advantages of the present invention will become apparent to those skilled in the art upon reading the following detailed description when taken in conjunction with the drawings wherein there is shown and described an illustrative embodiment of the invention.

BRIEF DESCRIPTION OF THE DRAWINGS

The foregoing and other objects, features, and advantages of the invention will be apparent from the following more particular description of embodiments of the invention, as illustrated in the accompanying drawings. The elements of the drawings are not necessarily shown to scale relative to each other.

FIGS. 1A and 1B show exemplary chest radiographs with clipped anatomy.

DETAILED DESCRIPTION OF THE INVENTION

The following is a detailed description of the preferred embodiments of the invention, reference being made to the drawings in which the same reference numerals identify the same elements of structure in each of the several figures.

A radiographic image of an anatomical region such as a chest x-ray includes three main regions: the foreground; the background; and the anatomical region of interest. For purposes of describing the invention, the term "background" is used to denote the high intensity regions of a film or plate receiver, in which unattenuated radiation energy was absorbed by the receiver (that is, the area in which no body portion or object was present). "Foreground" will be used herein to designate the low intensity regions of the receiver, wherein highly absorbent structures (for example, collimator blades) are used to "frame" the field of irradiation on the receiver.

For the purpose of the description, the details given in this disclosure use human chest or thoracic x-ray imaging as the primary example. However, it can be appreciated that the same principles and methods can be similarly applied for images of other types or for imaging other anatomical regions of interest.

The present invention can be used for imaging systems that obtain digital image data from the radiographic receiver. This includes imaging systems such as Computed Radiography (CR) and Digital Radiography (DR) systems. Alternately, digital image data can be obtained by the digitization of an analog x-ray film image. Using systems such as these that obtain digital image data in some manner, the present invention is directed to a method for automatically detecting clipped anatomy in radiographic images.

Figure 2:
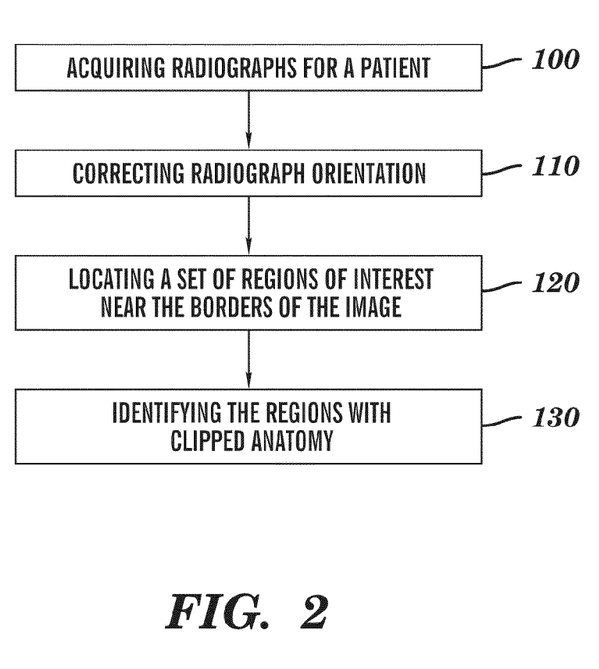
FIG. 2 is a logic flow diagram illustrating an automated method for detecting clipped anatomy in an image.

FIG. 2 shows an overall logic flow that can be used for the automated method of the present invention. FIG. 2 shows an image acquisition step 100, an orientation step 110, a region location step 120, and a clipped anatomy identification step 130.

Figure 4:
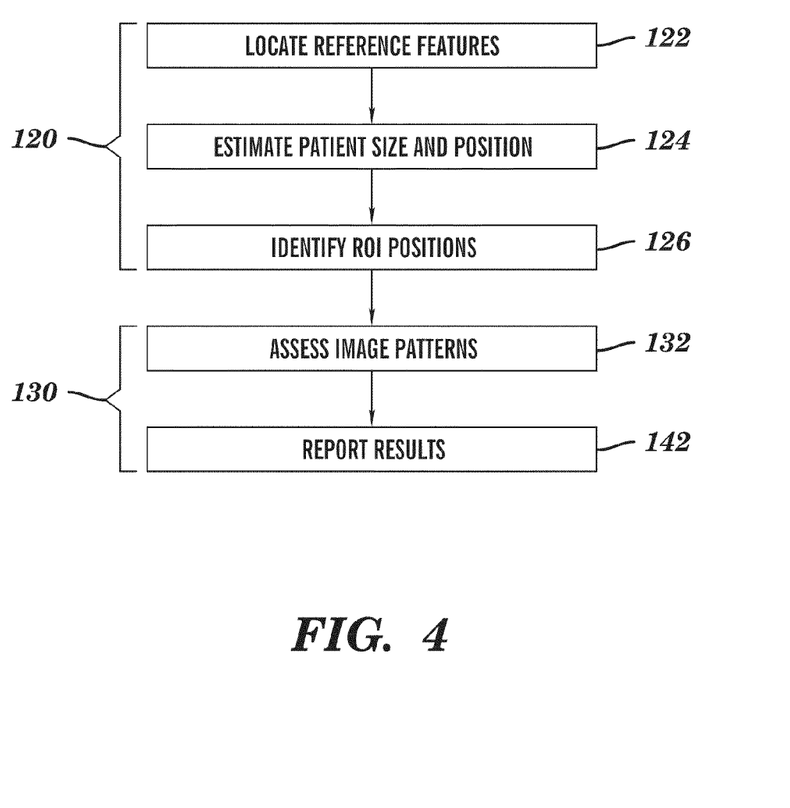
FIG. 4 is a logic flow diagram showing the overall process for image assessment.

FIG. 4 expands upon the process of region location step 120, to show how these ROIs that form the set are defined. Steps 122, 124, and 126 in FIG. 4 expand upon region location step 120 of FIG. 2, wherein step 122 is a locate reference feature step, step 124 is an estimate patient size and position step, and step 126 is an identify ROI positions step. Steps 132 and 142 of FIG. 4 expand upon a clipped anatomy identification step 130, wherein step 132 is an access image patterns step and step 142 is a report results step.

Referring again to FIG. 2, at image acquisition step 100, the radiographic image is obtained in digital form. The image can be obtained directly from a digital image receiver, such as those used for CR or DR imaging or from a scanned film. Optionally, the image can be obtained from a Picture Archiving and Communication System (PACS) or other networked source for radiographic images. For the processing required for clipped anatomy detection, the optional step of sub-sampling the image can be carried out, thereby reducing the volume of image data.

Proper positional orientation of the anatomical region of interest with respect to the receiver promotes obtaining accurate diagnostic assessment of the image and may be required for any further processing of image data. Continuing with the logic flow of FIG. 2, orientation step 110 is carried out, in order to organize the image data so that it represents the image content with a given, predetermined orientation. For example, referring back to FIGS. 1A and 1B, both chest images are provided at the same orientation, viewed as facing a vertical patient. Orientation step 110 may require rotation of the image or flipping of the image with respect to horizontal or vertical axes.

Image orientation correction step 110 can be accomplished in a number of ways familiar to those skilled in the image processing arts, including use of the automatic method disclosed in commonly assigned U.S. Patent Application Publication No. 2006/0110068, filed on Nov. 19, 2004 by Luo et al. entitled "DETECTION AND CORRECTION METHOD FOR RADIOGRAPHY ORIENTATION" and incorporated herein by reference.

Figure 3:
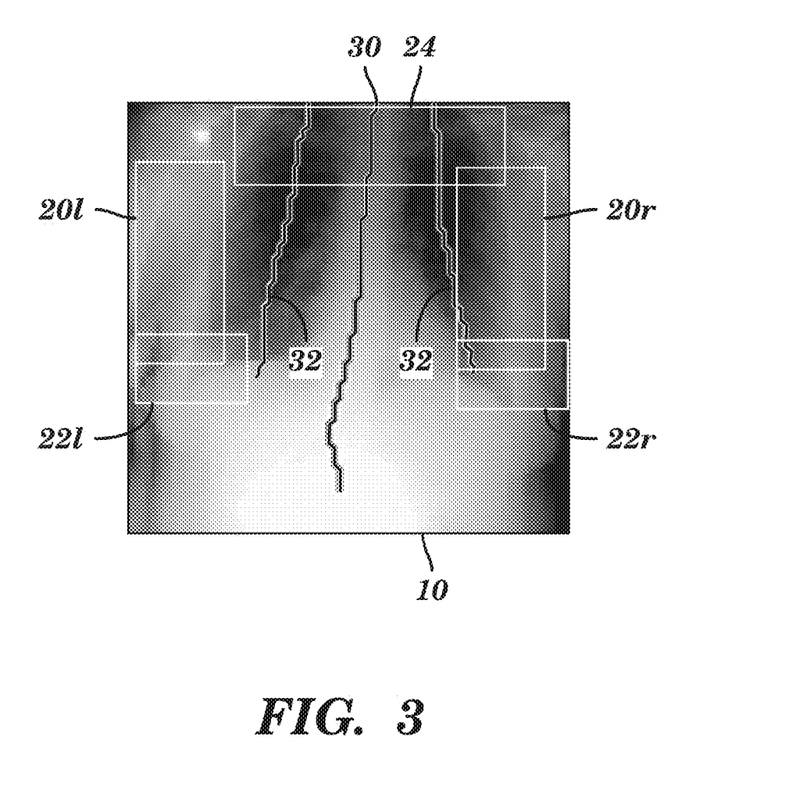
FIG. 3 is a plan view showing the location of a set of ROIs for a chest radiograph in one embodiment.

The image is preferably oriented to the predetermined orientation, then region location step 120 is carried out. In this step, a set having one or more regions of interest (ROI) is formed and applied to the image in order to identify or extract areas of the image that may have clipped anatomy. FIG. 3 shows a sample radiographic image 10 having a number of specific regions of interest (ROIs) 20*l*, 20*r*, 22*l*, 22*r*, and 24, shown as rectangular areas. Variables such as patient size and position are factors in defining the location of these ROIs. The logic flow diagram of FIG. 4 expands upon the process of region location step 120, to show how these ROIs that form the set are defined.

Figure 6A:
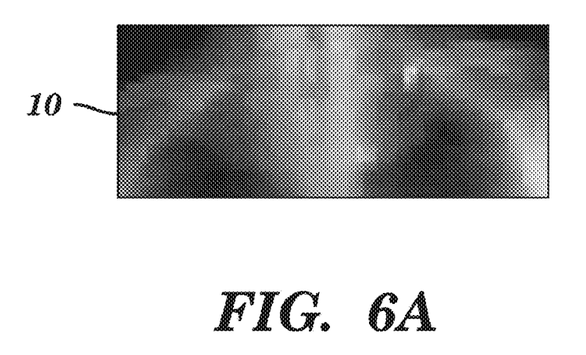
FIGS. 6A and 6B show ROIs of Apex region in a chest radiograph image that are not clipped and clipped, respectively.
Figure 6B:
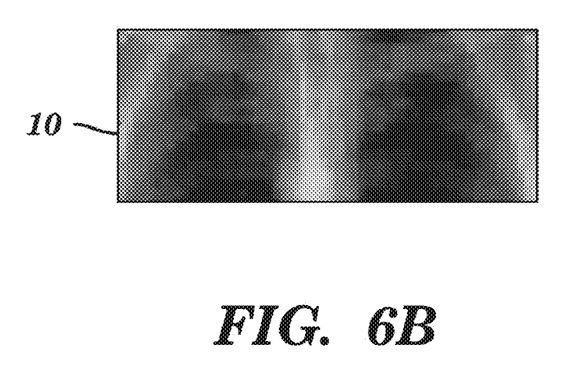

According to radiography standards, a chest radiograph should provide complete images of both lungs. An image that is missing any portion of a lung region is considered to have clipped anatomy and radiographs with clipped anatomy generally require a retake. By way of example, FIG. 6A shows an upper portion of a chest radiographic image 10 that is not clipped; FIG. 6B shows an upper portion of a chest radiographic image 10 that is clipped, with the image missing an upper portion of the lung. To detect an unwanted clipped anatomy condition such as that shown in FIG. 6B, the present invention uses the process shown in the more detailed logic flow diagram of FIG. 4. Steps 122, 124, and 126 in FIG. 4 expand upon region location step 120 of FIG. 2. Steps 132 and 142 expand upon a clipped anatomy identification step 130.

It is desirable to "frame" the image so that regions of interest can be defined for further image analysis. A locate reference features step 122 (FIG. 4) locates key features that help to estimate the position and size of the major anatomical structures in the image. For the chest x-ray image 10 of the example shown in FIG. 3, a spine midline 30 and two lung centerlines 32 are identified. This detection can be carried out using feature analysis algorithms known to those skilled in the image analysis art. Using these reference feature lines, an estimate size and position step 124 is executed to estimate the patient's position and patient size in the radiograph image. In accordance with an embodiment of the present invention, the position of the patient can be determined by the center of the spine midline, while the size of the patient can be computed using:

$$\text{Size of\_patient}=C*(|\text{center of the left lung}-\text{center of the spine midline}|+|\text{center of the right lung}-\text{center of the spine midline}|)$$

where C is a constant value, empirically determined for the type of image that is obtained.

With this computed size and position data, an identify ROI positions step 126 (FIG. 4) focuses on anatomy near/proximate the border of the image, as shown in FIG. 3 at regions of interest (ROIs) 20*l*, 20*r*, 22*l*, 22*r*, and 24. Using known patterns that apply for the type of image that is obtained, ROI positions step 126 identifies, from the image data, a set of regions of interest that can be used for further processing, as described subsequently.

Still referring to FIG. 3, following reference feature line detection that detects the spine midline 30, ROI 24 corresponding to the apex region of the chest can be located at the top of the image, centering on the spine midline 30. Two ROIs 20*l* and 20*r* are then allocated on the left and right boundary of the image, respectively, if it is detected that the edges of the lungs are close to the boundary of the image based on patient size and position data, as noted earlier. In order to detect whether or not lung corners are clipped, two additional ROIs 22*l* and 22*r* are defined over the lower area and beneath ROIs 20*l* and 20*r* as shown in FIG. 3. ROIs 22*l* and 22*r* should contain the lung corners, as shown.

With the ROI images extracted, their image content pattern can be assessed using image pattern analysis software, and telltale patterns that may indicate clipping of features can be identified in an assess image patterns step 132. This may be preceded by optional sub-sampling of the ROI images.

Results can be displayed, printed, or stored in a report results step 142.

Assess image patterns step 132 is executed to examine the ROIs in detail. With respect to the example chest radiograph image in FIG. 3, either of two lung image patterns can be identified in the ROIs 20*l*, 20*r*, 22*l*, 22*r*, and 24. A normal pattern indicates non-clipped anatomy. An abnormal pattern has characteristics that indicate clipped anatomy.

Figure 5:
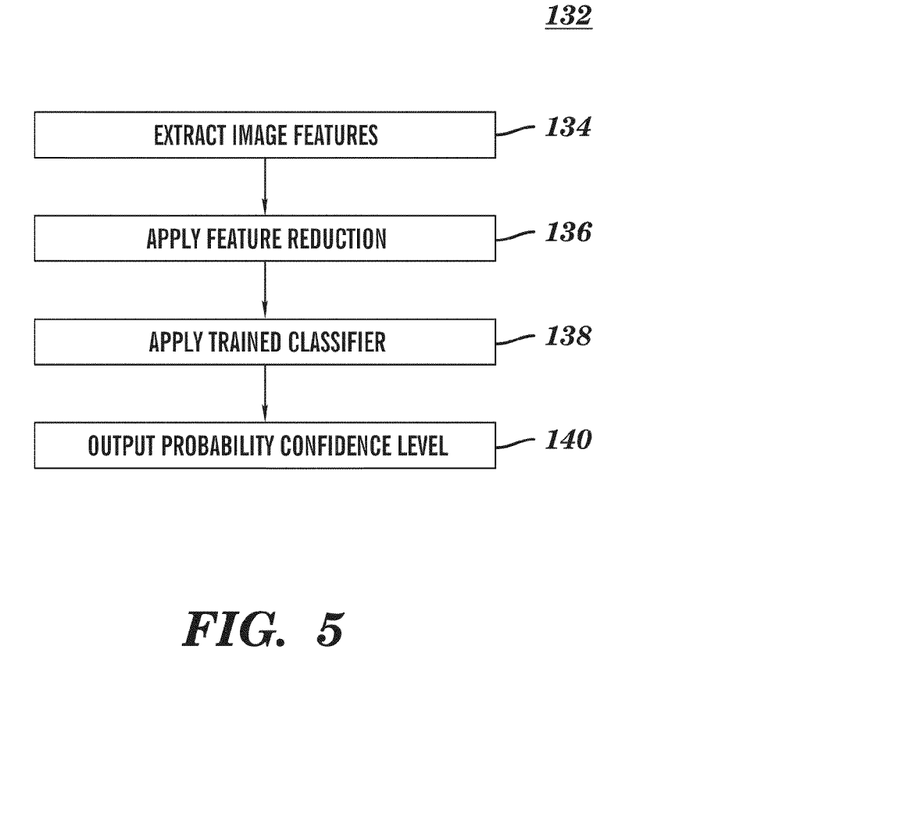
FIG. 5 is a logic flow diagram showing detailed procedures for ROI assessment according to one embodiment.

The implementation of this ROI assessment in assess image patterns step 132 of FIG. 4 can be performed using the steps shown in the logic flow diagram of FIG. 5. An extract image features step 134 is executed as part of assess image patterns step 132. In step 134, a set of image features is extracted from each ROI that was identified in step 126 (FIG. 4). One method to accomplish this is to extract according to image intensities. The following substeps can be employed:

(i) Divide the ROI into N×N sub-blocks, where N is some suitable integer.
(ii) Calculate an average intensity ($I_i$) from each of the N×N sub-blocks.
(iii) Form a low level ROI image with a feature vector defined as $x = \{I_1, I_2, \ldots I_{N \times N}\}$.

It is noted that intensity is only one of a number of image characteristics that can be extracted from the ROI as part of this step. For example, other characteristics that might be successfully employed include contrast, gradient, or statistical characteristics such as texture.

Next, feature reduction methods can be implemented in an apply feature reduction step 136. This step optimizes the feature characteristics extracted for the ROI in the previous step to help reduce the dimensions of the feature vector and improve performance by identifying salient features. One feature reduction method that can be used is Principal Component Analysis (PCA), well known to those skilled in the diagnostic image assessment arts.

An apply trained classifier step 138 follows, in which a trained classifier algorithm can be employed to recognize patterns of clipped or unclipped anatomy in the ROI. In an output probability confidence level step 140, this trained classifier generates and outputs a probability value corresponding to its judgment of clipped or non-clipped status.

Referring again to FIG. 4, report results step 142 is executed at the end of this sequence. In the case of an image having clipped anatomy, the system can highlight the ROI or general region of the clipped anatomy in the image when displayed or printed. The results can be displayed at the console interface, for example, along with the processed or unprocessed image or both images.

According to one exemplary embodiment of the present invention, the clipped anatomy can also be detected by analyzing the position and geometrical properties of reference feature lines of the anatomical structures in the image. Reference feature lines can be identified to correspond to the major anatomical structures in images, as described earlier with reference to FIG. 3, as such, their positions and geometrical relations can help to determine if clipped anatomy occurs in the images.

Figure 7:
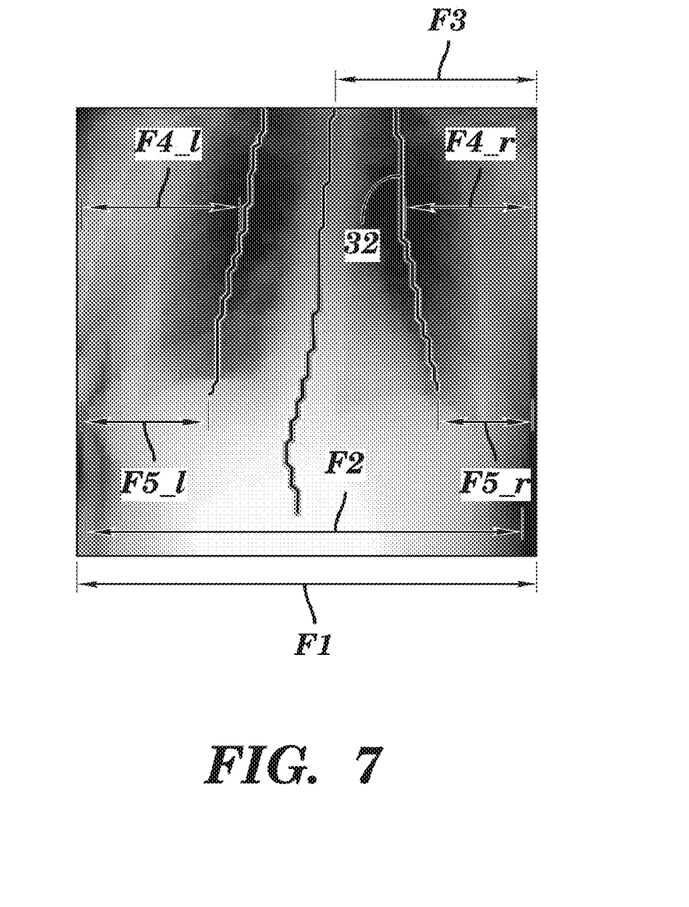
FIG. 7 illustrates dimensions used in the computation of a set of features from a chest radiograph to detect clipped anatomy.

FIG. 7 illustrates a set of features that can be employed to detect clipped anatomy from a chest radiograph. In the particular example, five features are calculated from reference features in the image. A first feature (F1) is the width of the image. A second feature (F2) is the patient size, which can be computed as described earlier. A third feature (F3) relates to the patient's position in the image; more specifically, to a minimum distance between the center of the spine midline and the edges of the image. Features F4_r, and F4_l provide a minimum distance of the center of lung centerline to its image edges. Features F5_r, and F5_l provide a minimum distance of a lung centerline to its close image edges. In this embodiment, detecting the clipped anatomy uses the following five-element feature vectors:

Left lung: {F1, F2, F3, F4_l, F5_l}
Right lung: {F1, F2, F3, F4_r, F5_r}

A trained classifier using these five features of each feature vector can be employed to recognize the clipped anatomy. It is noted that this is by way of example only; the present invention is not limited to the above features or feature vectors. Any features that can be derived from the image or reference features can be used as long as they can help in distinguishing the clipped and unclipped anatomy characteristics.

In another embodiment, clipped anatomy can be identified by first outlining anatomical structures in the image. This process identifies anatomical structures and defines their boundaries based on known relationships and conditions. Then, the position and geometrical properties of the anatomical structures in the image are analyzed and any clipped anatomical structures identified. Methods for defining the outline of a structure within an image are familiar to those skilled in the image processing arts. Various edge-contrast enhancement algorithms and image processing techniques using digital unsharp-masking can be employed, for example.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the above detailed description shows how the present invention addresses problems related to chest radiograph images. However, this method could be more broadly applied, using a similar sequence of processes, for images other than chest radiographs, including mammography images and other types of x-rays or other diagnostic images. Various types of methods for image assessment could be used as alternatives to those described with reference to FIGS. 4 and 5. Subsampling of image data could be used during various stages of image processing, in order to facilitate processing speed.

Thus, what is provided is an apparatus and method for automatically detecting clipped anatomy in medical images.

PARTS LIST

10. Radiographic Image
20*l*, 20*r*, 22*l*, 22*r*, 24. Region of interest (ROI)
30. Spine Midline
32. Lung Centerline
100. Image Acquisition Step
110. Orientation step
120. Region location step 122. Locate reference features step
124. Estimate size and position step
126. Identify ROI positions step
130. Clipped anatomy identification step
132. Assess image patterns step
134. Extract image features step
136. Apply feature reduction step
138. Apply trained classifier step
140. Output probability confidence level step
142. Report results step
C1, C2. Box
F1, F2, F3, F4_l, F4_r, F5_l, F5_r. Feature

The invention claimed is:

1. A method for detecting clipped anatomy in a radiographic image having a border, executed by a processor, comprising:
   obtaining image data for the radiographic image;
   arranging the image data according to a predetermined image orientation;
   forming a set comprising one or more regions of interest located proximate the border of the image;
   analyzing image content of each region of interest of the set to identify a region having clipped anatomy; and displaying at least a portion of the image with the clipped anatomy identified.

2. The method of claim 1 wherein forming the set of regions of interest comprises:
   locating one or more reference features from the radiographic image;
   calculating patient size and position according to the located reference features; and
   identifying one or more regions of interest according to the calculated patient size and position and according to the one or more reference features.

3. The method of claim 2 wherein the one or more reference features indicate the location of the lungs.

4. The method of claim 1 wherein analyzing image content in each region in the set and identifying any region with clipped anatomy further comprises:
   extracting at least one image feature according to at least one image characteristic;
   forming a feature vector for the at least one image feature;
   applying feature reduction to the feature vector for the extracted image feature to obtain a reduced image feature vector;
   applying a trained classifier to assess the reduced image feature vector; and
   generating a probability value of clipped anatomy according to results from the trained classifier.

5. The method of claim 4 wherein applying feature reduction comprises using principal component analysis.

6. The method of claim 4 wherein forming a feature vector comprises using dimensional data from the at least one extracted image feature.

7. The method of claim 1 wherein the image data is from a chest x-ray.

8. The method of claim 1 further comprising printing at least a portion of the image with the clipped anatomy highlighted.

9. The method of claim 1 wherein the one or more reference features indicate the location of the spine.

10. The method of claim 1 further comprising sub-sampling the image to reduce the amount of image data that is processed for clipped anatomy detection.

11. The method of claim 1 wherein analyzing image content comprises sub-sampling the image data.

12. A method for detecting clipped anatomy in a radiographic image, executed by a processor, comprising:
    obtaining image data for the radiographic image;
    arranging the image data according to a predetermined image orientation;
    outlining anatomical structures in the image;
    analyzing the position and geometrical properties of the anatomical structures in the image and identifying one or more clipped anatomical structures; and displaying at least a portion of the image with the clipped anatomy highlighted.

13. The method of claim 12 wherein outlining anatomical structures in the image comprises applying digital unsharp masking.

14. A method for detecting clipped anatomy in a radiographic image, executed by a processor, comprising:
    obtaining image data for the radiographic image;
    arranging the image data according to a predetermined image orientation;
    forming a set comprising one or more regions of interest that are located near the borders of the image by:
    (a) locating one or more reference features from the image;
    calculating patient size and position according to the located reference features; and
    (c) identifying the one or more regions of interest according to the calculated patient size and position and according to the one or more reference features; and
    analyzing image content in each region of interest in the set and identifying one or more regions with clipped anatomy.

* * * * *